United States Patent
Patel et al.

(10) Patent No.: US 8,339,081 B2
(45) Date of Patent: Dec. 25, 2012

(54) METHOD AND APPARATUS FOR LOW SPEED PERMANENT MAGNET MOTOR OPERATION

(75) Inventors: Nitinkumar R. Patel, Cypress, CA (US); Yo Chan Son, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 582 days.

(21) Appl. No.: 12/558,291

(22) Filed: Sep. 11, 2009

(65) Prior Publication Data

US 2011/0062902 A1 Mar. 17, 2011

(51) Int. Cl.
*H02P 6/18* (2006.01)

(52) U.S. Cl. .............. 318/400.33; 318/400.02; 318/702

(58) Field of Classification Search .......... 318/400.02, 318/400.32, 400.33, 720–724, 702
See application file for complete search history.

(56) References Cited

U.S. PATENT DOCUMENTS

| | | | |
|---|---|---|---|
| 6,492,788 B1 * | 12/2002 | Agirman et al. ............. | 318/700 |
| 6,531,843 B2 | 3/2003 | Iwaji et al. | |
| 6,894,454 B2 * | 5/2005 | Patel et al. ................. | 318/700 |
| 7,045,988 B2 * | 5/2006 | Ha et al. ..................... | 318/807 |
| 7,098,623 B2 * | 8/2006 | Piippo ........................ | 318/721 |
| 7,271,562 B2 * | 9/2007 | Lee et al. .................... | 318/609 |
| 7,511,448 B2 | 3/2009 | Terada et al. | |
| 7,759,897 B2 * | 7/2010 | Piippo ........................ | 318/700 |
| 2004/0070360 A1 * | 4/2004 | Schulz et al. ................ | 318/700 |
| 2008/0048599 A1 * | 2/2008 | Ho ............................. | 318/400.33 |

OTHER PUBLICATIONS

German Patent Office, German Office Action dated May 8, 2012 for German Application No. 10 2010 040 393.8.

* cited by examiner

*Primary Examiner* — Bentsu Ro
(74) *Attorney, Agent, or Firm* — Ingrassia Fisher & Lorenz, P.C.

(57) ABSTRACT

Methods and apparatus are provided for startup of a permanent magnet alternating current (AC) motor. The method comprises the steps of detecting startup of the permanent magnet AC motor; detecting a mechanical oscillation of the permanent magnet AC motor when startup of the permanent magnet AC motor is detected; and, in response to detection of the mechanical oscillation of the permanent magnet AC motor when startup is detected, suppressing the mechanical oscillation of the permanent magnet AC motor.

18 Claims, 4 Drawing Sheets

US 8,339,081 B2

METHOD AND APPARATUS FOR LOW SPEED PERMANENT MAGNET MOTOR OPERATION

TECHNICAL FIELD

The present invention generally relates to electric motor systems, and more particularly relates to a method and apparatus for low speed sensorless operation of a permanent magnet alternating current (AC) electric motor in an electric motor system.

BACKGROUND OF THE INVENTION

During low speed operation of a permanent magnet (PM) electric motor in accordance with conventional algorithms that estimate the rotor position based on the voltage and current without using the rotor position or speed sensor (i.e., in accordance with "sensorless algorithms"), a high frequency signal is injected into a flux axis of a motor stator winding of the PM electric motor and the torque axis of the motor stator winding is monitored to derive rotor position and speed information without using any mechanical position or speed sensor. While this sensorless method works well for internal PM motors which are designed not to saturate under full load conditions, presently PM motors are required to have the highest possible power density. Such PM motors would necessarily be able to operate in heavy saturation at high load conditions.

Accordingly, it is desirable to provide a method and apparatus for sensorless operation of a permanent magnet motor which provides robust low speed control under heavily saturated operating conditions. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for low speed sensorless control of a permanent magnet motor. The method includes injecting a high frequency signal into a flux axis of the permanent magnet motor and sensorlessly determining a rotor position and a rotor speed in response to both a flux axis error signal on a flux axis of the permanent magnet motor and a torque axis error signal on the torque axis of the permanent magnet motor. Both the flux axis error signal and the torque axis error signal are determined in response to current vector signals in a synchronous reference frame.

In addition, a sensorless controller is provided for a permanent magnet motor. The controller includes a first signal processing path, a second signal processing path, and a speed/position generator. The first signal processing path determines a first error component signal in response to a flux axis of the permanent magnet motor. The second signal processing path determines a second error component signal in response to a torque axis of the permanent magnet motor. And the speed/position generator generates a sensorless rotor speed and a sensorless rotor position in response to the first error component signal and the second error component signal.

Further, an electric motor system is provided, the electric motor system comprising a permanent magnet motor, an inverter, a controller, and a sensorless position and speed estimator. The permanent magnet motor includes a plurality of phases and the inverter generates a plurality of phase signals in response to modulated control signals. The inverter is coupled to the permanent magnet motor and provides each of the plurality of phase signals to a corresponding one of the plurality of phases of the permanent magnet motor. The controller generates the modulated control signals in response to a sensorless position signal, a sensorless speed signal and phase current signals, the phase current signals corresponding to currents of one or more of the plurality of phase signals. The sensorless position and speed estimator generates the sensorless position signal and the sensorless speed signal in response to the phase current signals and includes a low speed error extraction module for determining a low speed error signal in response to the phase currents, a sensorless position feedback signal, and a sensorless speed feedback signal; a high speed error extraction module for determining a high speed error signal in response to the phase currents, the phase voltages, the sensorless position feedback signal; and the sensorless speed feedback signal; and an error combining module for determining the sensorless position signal and the sensorless speed signal in response to the high speed error signal and the low speed error signal. The sensorless position feedback signal is equivalent to the sensorless position signal and the sensorless speed feedback signal is equivalent to the sensorless speed signal. In addition, the phase currents correspond to currents on the plurality of phases of the permanent magnet motor and the phase voltages correspond to voltages on the plurality of phases of the permanent magnet motor. The low speed error extraction module includes a first signal processing path, a second signal processing path, and a speed/position generator. The first signal processing path determines a first error component signal in response to a flux axis of the permanent magnet motor. The second signal processing path determines a second error component signal in response to a torque axis of the permanent magnet motor. And the speed/position generator generates the sensorless rotor speed and the sensorless rotor position in response to the first error component signal and the second error component signal.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
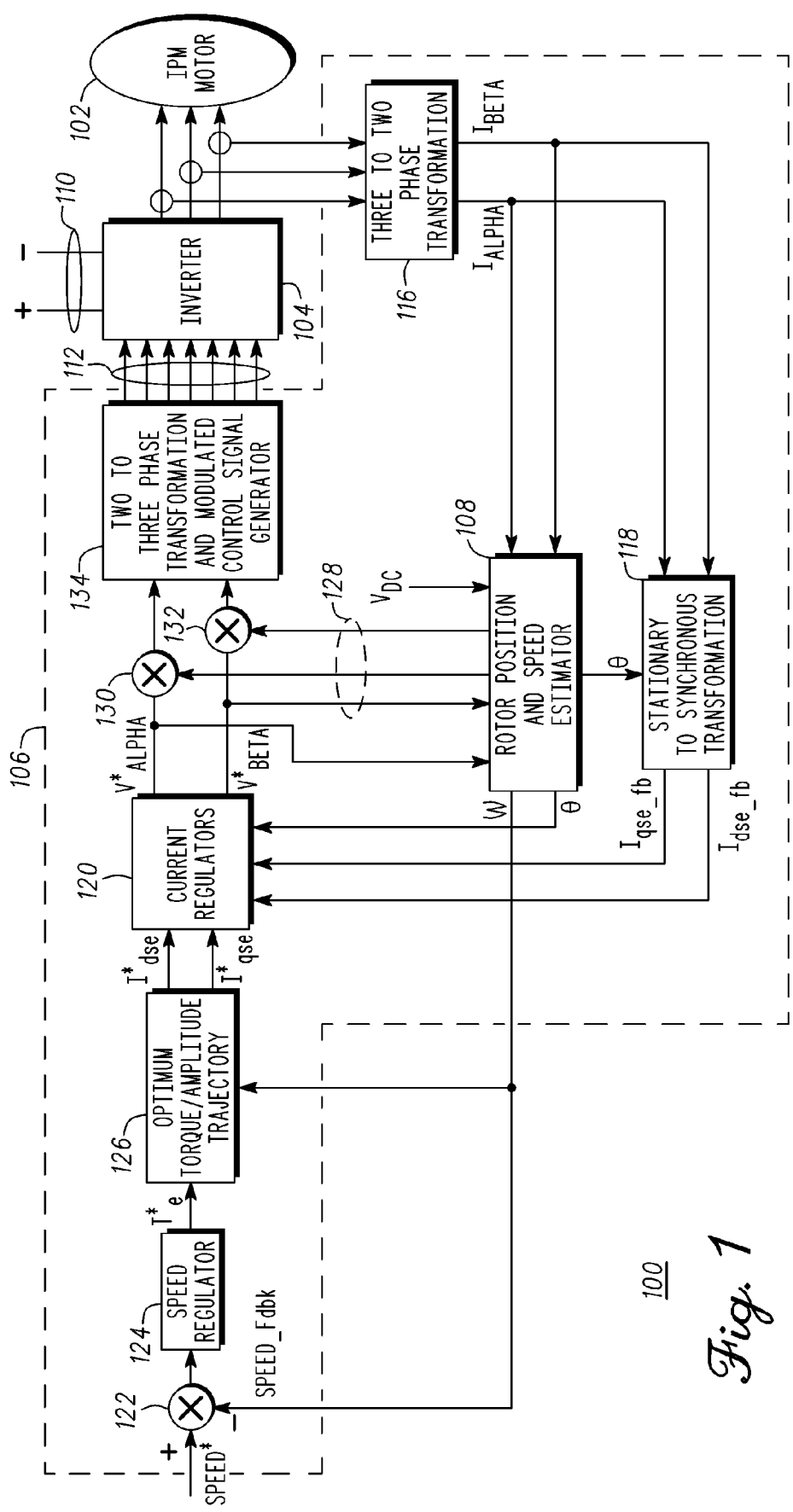
FIG. 1 illustrates a block diagram of an electric motor system in accordance with an embodiment of the present invention.

Referring to FIG. 1, a block diagram of an electric motor system 100 in accordance with the present embodiment includes a three-phase synchronous permanent magnet motor 102 operating under control of an inverter 104 and a controller 106, the controller 106 including a sensorless position and speed estimator 108. While the present embodiment includes a three-phase synchronous permanent magnet motor 102, the electric motor system 100 may include permanent magnet motors of other designs where the sensorless position and speed estimator 108 determines the position and speed of a rotating rotor in such permanent magnet motors in accordance with the present embodiment.

The inverter 104 is coupled to a direct current (DC) source 110 and generates a plurality of phase signals in response to modulated control signals 112 received from the controller 106 coupled thereto. The number of phase signals corresponds to the number of phases of the permanent magnet motor 102 which, in the present embodiment, includes three phases. The inverter 104 is coupled to the permanent magnet motor 102 and provides the plurality of phase signals on phase wires 114 for controlling the operation of the permanent magnet motor 102.

The controller 106 is coupled to the inverter 104 and generates the modulated control signals 112 in response to a sensorless position signal, a sensorless speed signal, a speed command signal, and phase current signals, the controller 106 providing the modulated control signals 112 to the inverter for generation of the plurality of phase signals. The phase current signals are generated by sensing currents on two or more of the plurality of phase signals. The phase current signals are generated by sensing currents on the three phase wires 114, the phase current signals being provided to a three to two transformation module 116 which converts the three phase current signals to equivalent two phase stationary frame alpha/beta currents, $I_\alpha$ and $I_\beta$. The two phase alpha/beta currents, $I_\alpha$ and $I_\beta$, are provided to the sensorless position and speed estimator 108 and to a stationary to synchronous transformation module 118. The stationary to synchronous transformation module 118 transforms the two phase alpha/beta currents $I_\alpha$ and $I_\beta$ to synchronous frame feedback currents, $I_{qse\_fb}$ and $I_{dse\_fb}$. The synchronous frame feedback currents, $I_{qse\_fb}$ and $I_{dse\_fb}$, are provided to current regulators 120 for generating stationary frame voltage commands, $V_\alpha^*$ and $V_\beta^*$.

Meanwhile, the speed command signal, Speed*, is provided from a higher level controller (not shown) to a summer 122 of the controller 106 which subtracts the sensorless speed signal, Speed_Fdbk, provided from the sensorless position and speed estimator 108 and provides the resultant command signal to a speed regulator module 124 which converts the command signal to a synchronous frame torque command signal, $T_e^*$. The torque command signal, $T_e^*$, is provided to an optimal torque command and optimal amplitude trajectory determination block 126 which generates two current commands in the synchronous reference frame, $I_{dse}^*$ and $I_{qse}^*$, for provision to the current regulators 120. Thus it can be seen that the stationary frame voltage commands, $V_\alpha^*$ and $V_\beta^*$, are generated by the current regulators 120 by combining the synchronous frame current commands, $I_{dse}^*$ and $I_{qse}^*$, with the synchronous frame feedback currents, $I_{qse\_fb}$ and $I_{dse\_fb}$, to obtain resultant voltage command signals and transforming the resultant voltage command signals to the stationary frame voltage commands, $V_\alpha^*$ and $V_\beta^*$, utilizing the rotor position signal from the rotor position and speed estimator 108. The stationary frame voltage commands, $V_\alpha^*$ and $V_\beta^*$, are combined with injected voltage commands, $V_{\alpha\_inject}$ and $V_{\beta\_inject}$ 128, at signal summers 130, 132 and the resultant signals are provided to a two to three phase transformation and modulated control signal generator 134 which generates the modulated control signals for provision to switching elements of the inverter 104.

The sensorless position signal and the sensorless speed signal correspond to a position and speed of a rotor rotating within the permanent magnet motor 102 and are generated by the sensorless position and speed estimator 108 operating entirely in a torque-speed plane. In accordance with the present embodiment, the sensorless position and speed estimator 108 generates the sensorless position signal and the sensorless speed signal in the torque-speed plane in response to the stationary frame phase current signals, $I_\alpha$ and $I_\beta$, and the stationary frame voltage command signals, $V_\alpha^*$ and $V_\beta^*$.

Figure 2:
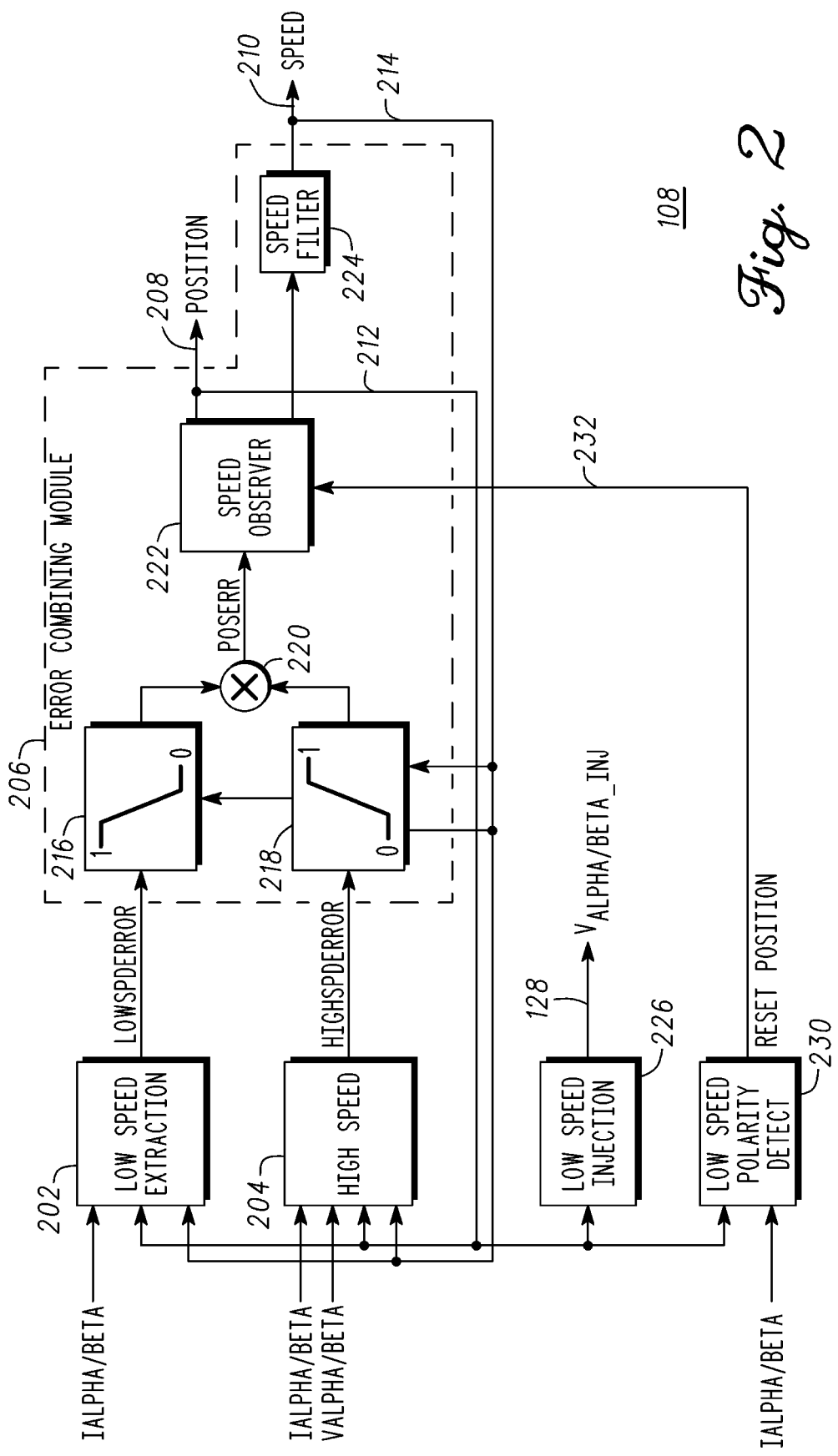
FIG. 2 illustrates a block diagram of a sensorless position and speed estimator of the electric motor system of FIG. 1 in accordance with the embodiment of the present invention.

Referring to FIG. 2, an exemplary structure of the sensorless position and speed estimator 108 is depicted. A low speed error extraction module 202 and a high speed error module 204 generate a low speed error signal and a high speed error signal, respectively. An error combining module 206 operates as a speed/position generator to generate the sensorless position signal 208 and the sensorless speed signal 210 for providing to the controller 106 (FIG. 1) in response to the low speed error signal and the high speed error signal. A sensorless position feedback signal 212 is connected to the sensorless position signal 208, thereby being equivalent thereto. Likewise, a sensorless speed feedback signal 214 is connected to the sensorless speed signal 210.

The low speed error extraction module 202 determines the position error signal in response to the sensorless position feedback signal 212, the sensorless speed feedback signal 214 and the two phase currents ($I_{alpha/beta}$), this position error signal being termed the low speed error signal. In a similar manner, the high speed error module 204 determines the position error signal in response to the sensorless position feedback signal 212, the sensorless speed feedback signal 214, the two phase currents ($I_{alpha/beta}$), and the two stationary frame voltage commands ($V_{alpha/beta}$), this position error signal termed the high speed error signal.

The error combining module 206 includes a low speed error phase out module 216 and a high speed error phase in module 218 for providing a smooth transition from low speed sensorless operation to high speed sensorless operation. The low speed error phase out module 216 receives the low speed error signal and the sensorless speed feedback signal to calculate a low speed error component value by phasing out the low speed error signal as the speed of the vehicle increases in response to the sensorless speed feedback signal and a predetermined phase-out coefficient. Similarly, the high speed error phase in module 218 receives the high speed error signal and the sensorless speed feedback signal to calculate a high speed error component value by phasing in the high speed error signal as the speed of the vehicle increases in response to the sensorless speed feedback signal and a predetermined phase-in coefficient. The predetermined phase-out coefficient is selected so that the low speed error component value is equal to the low speed error signal at near zero speeds and smoothly phases out (e.g., straight-line phase out) to where the low speed error component value is zero when the speed reaches a predetermined low-to-high-speed transition speed. In a like manner, the predetermined phase-in signal is selected so that the high speed error component value is equal to zero at near zero speeds and smoothly phases in (e.g., a straight-line phase in) to where the high speed error component value is equal to the high speed error signal when the speed reaches or exceeds the predetermined low-to-high-speed transition speed. An error signal summer 220 combines the low speed error component value and the high speed error component value to generate a rotor error position signal. A speed observer module 222 receives the rotor position error signal and, in response thereto, calculates the sensorless position signal 208 and an observed speed signal, the observed speed signal being filtered by a speed filter 224 to generate the sensorless speed signal 210.

A low speed injection module 226 generates the injected voltage commands, $V_{\alpha\_inject}$ and $V_{\beta\_inject}$, as low speed injection signals 128 for providing to the summers 130, 132 at startup of the electric motor system 120 and at near zero low speeds to inject a high frequency signal into the flux axis of the permanent magnet motor 102 for operation of the low speed extraction module 202 in accordance with the present embodiment. The magnitude of the injected voltage commands, $V_{\alpha\_inject}$ and $V_{\beta\_inject}$, are generated in response to an injected voltage, $V_{inj}$, which is calculated in accordance with Equation 1.

$$\begin{aligned} V_{inj} & \quad (1) \\ = V_0 & \quad \text{if } |\omega_r| < \omega_{LH1} \\ = V_0 - \frac{V_0}{\omega_{LH2} - \omega_{LH1}} \cdot (\omega_r - \omega_{LH1}) & \quad \text{if } \omega_{LH1} < |\omega_r| < \omega_{LH2} \\ = 0 & \quad \text{if } |\omega_r| > \omega_{LH2} \end{aligned}$$

wherein $V_0$ is the injected voltage at zero speed, $\omega_{LH1}$ is the maximum speed to use the full injection voltage of $V_0$, and $\omega_{LH2}$ is the minimum speed that does not use the injection voltage. In this manner, the injection voltages fed to the signal summers 130, 132 are phased out between $\omega_{LH1}$ and $\omega_{LH2}$ of the absolute motor speed as the motor speed increases.

A low speed polarity detector 230 compares the low speed error determined in response to the sensorless position feedback signal 212 to the two phase currents ($I_{alpha/beta}$). When the initial rotor position information is determined by the sensorless rotor position and speed estimator 108, it is imperative to differentiate between the positive and negative D axis (i.e., the rotor magnet north and south poles). The low speed polarity detector 230 determines from the low speed error and the two phase currents ($I_{alpha/beta}$) whether the sensorless rotor position signal is properly aligned with the rotor north pole. If the sensorless rotor position signal is not properly aligned with the rotor north pole, a reset position signal 232 is provided to the speed observer module 222. In response to the reset position signal 232, the speed observer module 222 switches the polarity of the sensorless rotor position signal so that the position signal 208 is correctly aligned with the rotor position.

In this manner, the sensorless position and speed estimator 108 provides the sensorless position signal 208 and the sensorless speed signal 210 as feedback signals at both low and high speeds. Particularly, the error combining module 206, including the low speed error phase out module 216 and the high speed error phase in module 218, provides a smooth transition from low speed sensorless operation to high speed sensorless operation.

Figure 3:
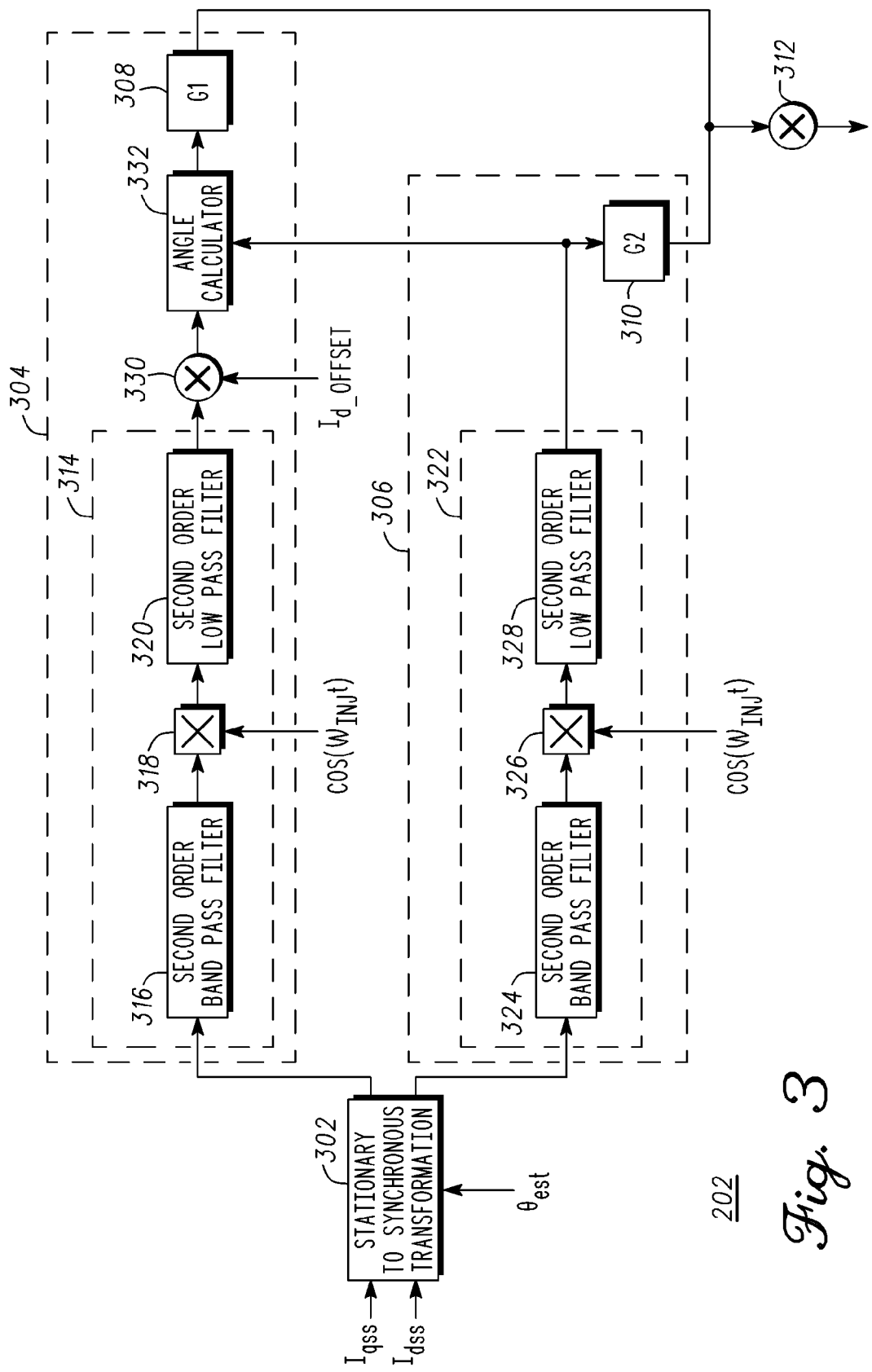
FIG. 3 illustrates a block diagram of a low speed extraction module of the sensorless position and speed estimator FIG. 2 in accordance with the embodiment of the present invention.

Referring to FIG. 3, a block diagram of a low speed extraction module 202 in accordance with the present invention includes a stationary to synchronous transformation module 302 for transforming the stationary current signals, $I_\alpha$ and $I_\beta$, to synchronous current signals, $I_d$ and $I_q$, on the flux and torque axes in response to the position feedback signal, $\theta_{est}$. The synchronous current signals, $I_d$ and $I_q$, are each provided to respective first and second signal processing paths 304 and 306 for processing thereof to determine respective first and second error component signals. The first error component signal is provided to a first signal weighting module 308 for multiplication of the first error component signal by a flux axis error signal weighting factor to generate a flux axis error signal. In a similar manner, the second error component signal is provided to a second signal weighting module 310 for multiplication of the second error component signal by a torque axis error signal weighting factor to generate a torque axis error signal. In accordance with the present embodiment, an error signal summer 312 combines the flux axis error signal and the torque axis error signal to generate a strong low speed error signal for provision to the error combining module 206 (FIG. 2) and thence to the speed observer 222 (FIG. 2). The speed observer 222 operates in conjunction with the first and second signal weighting modules 308 310 and the error signal summer 312 as a speed/position generator for sensorlessly generating the rotor speed and position signals in response to the first and second error component signals The first processing path 304 includes a decode path 314 wherein the flux axis current signal is filtered by a second order bandpass filter 316 and then frequency mixed at a mixer 318 to adjust the filtered signal in response to the high frequency signal injected into the flux axis of the motor 102. After the mixer 318 frequency mixes the filtered signal with a signal $\cos(\omega_{inj}t)$ generated in response to the injected high frequency signal to convert the filtered signal to an intermediate frequency, the converted signal is filtered by a second order lowpass filter 320.

In a similar manner, the second processing path 306 includes a decode path 322 wherein the torque axis current signal is filtered by a second order bandpass filter 324 and then frequency mixed at a mixer 326 with the signal—$\cos(\omega_{inj}t)$ to convert the filtered signal to the intermediate frequency, the converted signal then being filtered by a second order lowpass filter 328 to generate the second error component signal for the second signal processing path 306.

Returning to the first signal processing path 304, after filtering the converted flux axis signal by the lowpass filter 320, a flux axis synchronous reference frame offset current, $I_{d\_offset}$, is then subtracted from the resultant signal at a summer 330. The error component signal for the first processing path 304 is then generated by an angle calculator 332 which adjusts the flux axis signal by an angle difference in the synchronous reference frame between the flux axis signal and the second error component signal generated by the second signal processing path 306.

Conventional low speed sensorless rotor speed and position calculation schemes inject a high frequency signal into the flux axis of a permanent magnet motor and sensorlessly determine the rotor speed and position in response to error observed on the torque axis of the permanent magnet motor. In accordance with the present embodiment, the low speed extraction module 202 sensorlessly determines the rotor speed and position in response to error observed on both the torque axis (via the second signal processing path 306) and the flux axis (via the first signal processing path 304) of the motor 102. In this manner, the low speed extraction module 202 provides a stronger error signal from the summer 312 for utilization at low speeds by the speed observer 222 (FIG. 2). Accordingly, the low speed extraction module 202 provides robust low speed sensorless controls capable of operating under heavily saturated, high load operating conditions of the electric motor system 100, thereby enabling design of electric motor systems in accordance with the present embodiment having increased power density.

Figure 4:
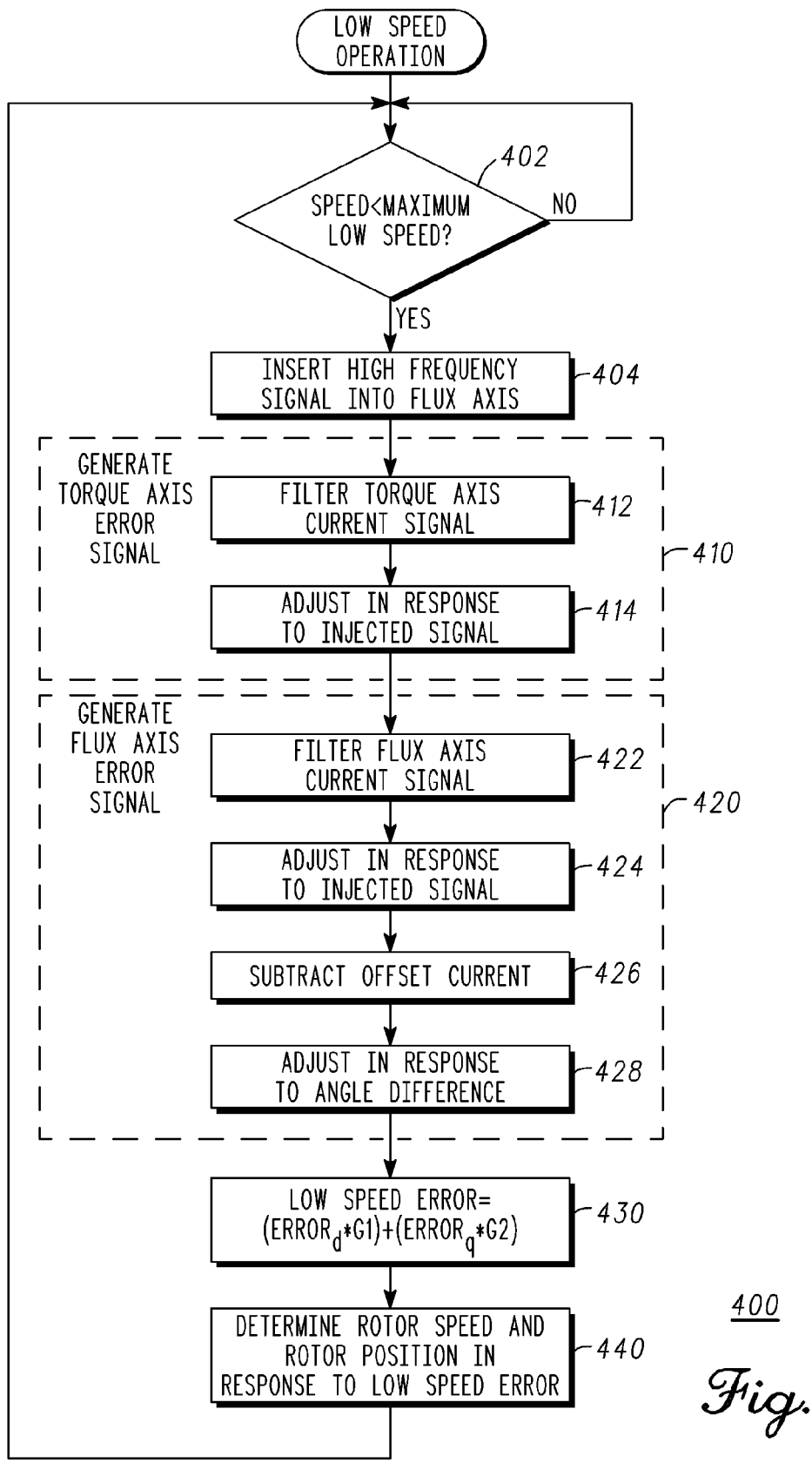
FIG. 4 illustrates a flow chart of the operation of a low speed extraction module of the sensorless position and speed estimator FIG. 2 in accordance with the embodiment of the present invention.

While an exemplary construction of the low speed extraction module 202 has been depicted in FIG. 3, those skilled in the art will realize that a low speed extraction module 202 which calculates a sensorless speed signal and a sensorless position signal at zero speed (e.g., startup) and near zero speeds can be constructed in any one of a number of different configurations. For example, the phase control signals ($I_{alpha/beta}$) can be digitized and the calculation of the sensorless position signal and the sensorless speed signal can be enabled in software. Accordingly, FIG. 4 depicts a flowchart 400 of the operation of the low speed extraction module 202 performing sensorless position and speed estimation at zero speed and near zero speeds in accordance with the present embodiment.

Low speed sensorless control of the motor 102 initially determines 402 whether the speed of the motor is within a low speed range such as at startup or at near zero speeds (i.e., whether the speed is less than a predetermined maximum low speed). When the speed is within the low speed range 402, a high frequency signal is injected 404 into the flux axis of the motor 102.

A torque axis error signal is then generated 410 by filtering 412 a torque axis synchronous reference frame current signal and recovering the torque axis error signal from the filtered signal in response to the injected high frequency signal 414.

Next, a flux axis error signal is generated 420. First, a flux axis synchronous reference frame current signal is filtered 422 and the filtered signal is adjusted 424 in response to the injected high frequency signal to recover an error signal. A synchronous reference frame offset current value is then subtracted 426 from the error signal. Finally, the flux axis error signal is generated by adjusting the summed value 428 in response to an angle difference in the synchronous reference frame between the summed value and the torque axis error signal.

The combined low speed error signal is then generated by combining 430 a weighted factor of the flux axis error signal ($G1*Error_d$) and a weighted factor of the torque axis error signal ($G2*Error_q$). The rotor position and the rotor speed are then sensorlessly determined 440 in response to the combined low speed error signal. Processing then returns to confirm that the operation is a low speed operation 402 before sensorlessly recalculating the rotor position and rotor speed.

Thus it can be seen that the present method and apparatus for low speed sensorless generation of rotor speed and rotor position utilizes error signals produced in both the torque and flux axes, thereby providing a stronger error signal at low speeds for the speed observer 222 (FIG. 2) to generate the sensorless position signal 208 and the sensorless speed signal 210. The strong combined error signal, thereby, provides robust low speed control for all operating conditions, including heavily saturated operating conditions. In this manner, the present method and apparatus for low speed sensorless generation of rotor speed and rotor position provides an electric motor system 100 with the highest possible power density, since such high power density electric motor systems may operate under heavy saturation conditions with a high load at low speeds.

While at least one exemplary embodiment has been presented in the foregoing detailed description, it should be appreciated that a vast number of variations exist. For example, the structure of the rotor speed and position estimator 108 as depicted in FIG. 2 could utilize other designs for the error combining module 206 other than the structure depicted It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for low speed sensorless control of a permanent magnet motor comprising:

injecting a high frequency signal into a flux axis of the permanent magnet motor; and sensorlessly determining a rotor position and a rotor speed in response to both a flux axis error signal on a flux axis of the permanent magnet motor and a torque axis error signal on the torque axis of the permanent magnet motor, both the flux axis error signal and the torque axis error signal determined in response to current vector signals in a synchronous reference frame;

wherein the step of determining the rotor position and the rotor speed comprises:

generating the flux axis error signal in response to a first error signal and a flux axis error signal weighting factor;

generating the torque axis error signal in response to a second error signal and a torque axis error signal weighting factor;

combining the first error signal and the second error signal to generate a combined error signal; and sensorlessly determining the rotor position and the rotor speed in response to the combined error signal.

2. The method in accordance with claim 1 wherein the step of generating the flux axis error signal comprises generating the first error signal in response to a synchronous reference frame offset value.

3. The method in accordance with claim 2 wherein the step of generating the first error signal further comprises generating the first error signal in response to an angle difference in the synchronous reference frame between the first error signal and the second error signal.

4. The method in accordance with claim 3 wherein the step of generating the first error signal further comprises filtering a flux axis synchronous reference frame current signal to generate a flux axis filtered signal and adjusting the flux axis filtered signal in response to the high frequency signal injected into the flux axis of the permanent magnet motor.

5. The method in accordance with claim 4 wherein the step of generating the torque axis error signal comprises filtering a torque axis synchronous reference frame current signal to generate a torque axis filtered signal and adjusting the torque axis filtered signal in response to the high frequency signal injected into the flux axis of the permanent magnet motor.

6. A sensorless controller for a permanent magnet motor comprising:

a first signal processing path for determining a first error component signal in response to a flux axis of the permanent magnet motor;

a second signal processing path for determining a second error component signal in response to a torque axis of the permanent magnet motor; and a speed/position generator for generating a sensorless rotor speed and a sensorless rotor position in response to the first error component signal and the second error component signal;

wherein the speed/position generator comprises:

a first signal weighting module coupled to the first signal processing path for generating a flux axis error signal in response to the first error component signal and a flux axis error signal weighting factor;
a second signal weighting module coupled to the second signal processing path for generating a torque axis error signal in response to the second error component signal and a torque axis error signal weighting factor; and
an error signal summer coupled to the first signal weighting module and the second signal weighting module for combining the flux axis error signal and the torque axis error signal to generate a combined error signal for generating the sensorless rotor speed in response thereto.

7. The sensorless controller in accordance with claim 6 wherein the speed/position generator further comprises a position speed observer coupled to the error signal summer for generating the sensorless rotor position in response to the sensorless rotor speed.

8. A sensorless controller for a permanent magnet motor comprising:
a first signal processing path for determining a first error component signal in response to a flux axis of the permanent magnet motor;
a second signal processing path for determining a second error component signal in response to a torque axis of the permanent magnet motor; and
a speed/position generator for generating a sensorless rotor speed and a sensorless rotor position in response to the first error component signal and the second error component signal;
wherein the first signal processing path comprises an angle calculator for generating the first error component signal in response to an angle difference in the synchronous reference frame between the first error signal and the second error signal.

9. The sensorless controller in accordance with claim 8 wherein the first signal processing path further includes a summer for receiving a synchronous reference frame offset current, the first signal processing path generating the first error component signal in response to the synchronous reference frame offset current.

10. The sensorless controller in accordance with claim 8 wherein the first and second signal processing paths include respective first and second decode paths, each of the first and second decode paths including at least a second order bandpass filter and a second order low pass filter.

11. The sensorless controller in accordance with claim 10 wherein the first and second decode paths each further include a mixer for adjusting signals on the first and second decode paths in response to the high frequency signal injected into the flux axis of the permanent magnet motor.

12. An electric motor system comprising:
a permanent magnet motor comprising a plurality of phases;
an inverter for generating a plurality of phase signals in response to modulated control signals and coupled to the permanent magnet motor for providing each of the plurality of phase signals to a corresponding one of the plurality of phases of the permanent magnet motor;
a controller for generating the modulated control signals in response to a sensorless position signal, a sensorless speed signal and phase current signals, the phase current signals corresponding to currents of one or more of the plurality of phase signals; and
a sensorless position and speed estimator for generating the sensorless position signal and the sensorless speed signal in response to the phase current signals, wherein the sensorless position and speed estimator comprises:
a low speed error extraction module for determining a low speed error signal in response to the phase currents, a sensorless position feedback signal, and a sensorless speed feedback signal;
a high speed error extraction module for determining a high speed error signal in response to the phase currents, the sensorless position feedback signal, and the sensorless speed feedback signal; and
an error combining module for determining the sensorless position signal and the sensorless speed signal in response to the high speed error signal and the low speed error signal, wherein the sensorless position feedback signal is equivalent to the sensorless position signal and the sensorless speed feedback signal is equivalent to the sensorless speed signal, and wherein the phase currents correspond to currents on the plurality of phases of the permanent magnet motor,
wherein the low speed error extraction module comprises:
a first signal processing path for determining a first error component signal in response to a flux axis of the permanent magnet motor;
a second signal processing path for determining a second error component signal in response to a torque axis of the permanent magnet motor; and
a speed/position generator for generating the sensorless rotor speed and the sensorless rotor position in response to the first error component signal and the second error component signal.

13. The electric motor system in accordance with claim 12 wherein the speed/position generator comprises:
a first signal weighting module coupled to the first signal processing path for generating a flux axis error signal in response to the first error component signal and a flux axis error signal weighting factor;
a second signal weighting module coupled to the second signal processing path for generating a torque axis error signal in response to the second error component signal and a torque axis error signal weighting factor; and
a low speed error signal summer coupled to the first signal weighting module and the second signal weighting module for combining the flux axis error signal and the torque axis error signal to generate a combined error signal for generating the sensorless rotor speed in response thereto.

14. The electric motor system in accordance with claim 13 wherein the error combining module comprises a position speed observer coupled to the low speed error signal summer of the low speed error extraction module and coupled to the high speed error module for generating the sensorless rotor position in response to the sensorless rotor speed.

15. The electric motor system in accordance with claim 12 wherein the first signal processing path comprises an angle calculator for generating the first error component signal in response to an angle difference in the synchronous reference frame between the first error signal and the second error signal.

16. The electric motor system in accordance with claim 15 wherein the first signal processing path further includes a summer for receiving a synchronous reference frame offset current, the first signal processing path generating the first error component signal in response to the synchronous reference frame offset current.

17. The electric motor system in accordance with claim 12 wherein the first and second signal processing paths include respective first and second decode paths, each of the first and second decode paths including at least a second order band-pass filter and a second order low pass filter.

18. The electric motor system in accordance with claim 17 wherein the first and second decode paths further include mixers for adjusting signals on the first and second decode paths in response to the high frequency signal injected into the flux axis of the permanent magnet motor.

* * * * *